(12) United States Patent
Sato et al.

(10) Patent No.: US 12,494,716 B2
(45) Date of Patent: Dec. 9, 2025

(54) SWITCHING POWER SUPPLY DEVICE

(71) Applicants: Takeshi Sato, Yokohama (JP); Minoru Kado, Sagamihara (JP)

(72) Inventors: Takeshi Sato, Yokohama (JP); Minoru Kado, Sagamihara (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 213 days.

(21) Appl. No.: 18/409,868

(22) Filed: Jan. 11, 2024

(65) Prior Publication Data

US 2024/0243666 A1 Jul. 18, 2024

(30) Foreign Application Priority Data

Jan. 12, 2023 (JP) .................................. 2023-002852

(51) Int. Cl.
*H02M 3/335* (2006.01)
*H02M 1/08* (2006.01)

(52) U.S. Cl.
CPC ......... *H02M 3/33569* (2013.01); *H02M 1/08* (2013.01)

(58) Field of Classification Search
CPC ...... H02M 3/33569; H02M 1/08; H02M 1/32; H02M 3/33523; H02M 3/33592
See application file for complete search history.

(56) References Cited

U.S. PATENT DOCUMENTS

| | | | |
|---|---|---|---|
| 10,536,089 B2* | 1/2020 | Hyugaji | G01R 19/155 |
| 10,554,140 B1* | 2/2020 | Khamesra | H02M 3/33592 |
| 11,088,628 B2* | 8/2021 | Hyugaji | H02M 3/33507 |
| 11,128,228 B2* | 9/2021 | Hyugaji | H02M 3/33592 |
| 11,201,555 B2* | 12/2021 | Kado | H02M 3/33523 |
| 2014/0078788 A1* | 3/2014 | Yao | H02M 3/33592 363/21.14 |
| 2018/0006569 A1* | 1/2018 | Kikuchi | H02M 3/33592 |
| 2019/0296632 A1* | 9/2019 | Hirose | H02M 1/4258 |

FOREIGN PATENT DOCUMENTS

| | | |
|---|---|---|
| JP | 006514910 B | 5/2019 |
| JP | 2019129549 A | 8/2019 |

* cited by examiner

*Primary Examiner* — Kyle J Moody
(74) *Attorney, Agent, or Firm* — Shih IP Law Group, PLLC.

(57) ABSTRACT

A switching power supply device includes a secondary-side control circuit including a switching control circuit that generates a voltage for ON-OFF control of a switching element for synchronous rectification. The secondary-side control circuit includes an external terminal to which a drain voltage of the switching element is input, a power supply terminal to which a voltage rectified by the switching element is input, a peak hold circuit that holds a peak of the drain voltage input to the external terminal, and an abnormality detection circuit that operates based on the voltage at the power supply terminal or a voltage derived from the voltage at the power supply terminal and a holding voltage of the peak hold circuit, and outputs an abnormality detection signal when detecting an abnormal state in which the voltage at the power supply terminal decreases or no voltage is input to the power supply terminal.

8 Claims, 6 Drawing Sheets

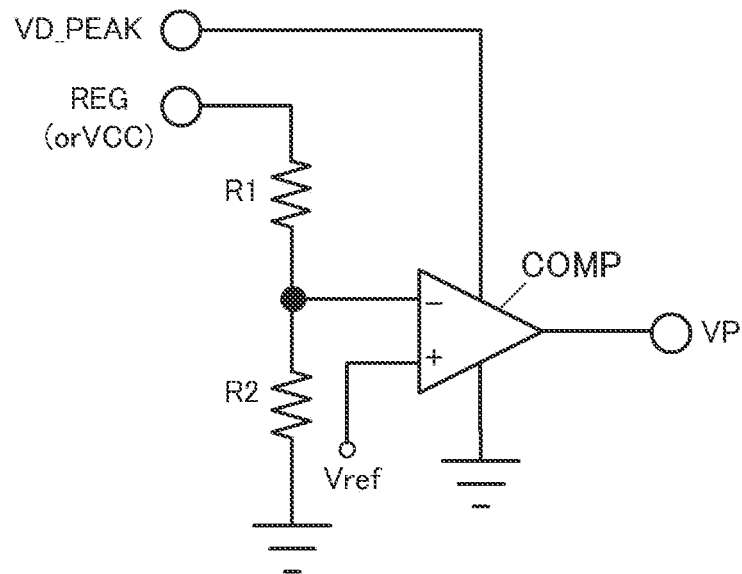
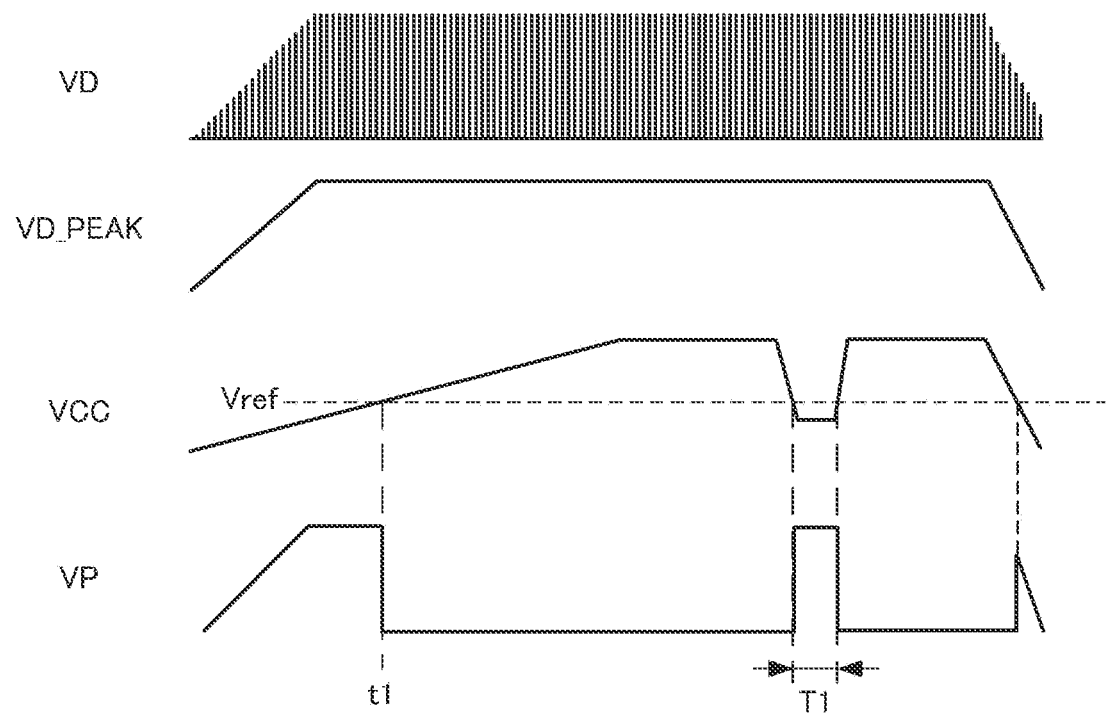

SWITCHING POWER SUPPLY DEVICE

REFERENCE TO RELATED APPLICATIONS

This application is based upon and claims the benefit of priority from the prior Japanese Patent Application No. 2023-002852, filed on Jan. 12, 2023, the entire content of which is incorporated herein by reference.

TECHNICAL FIELD

The present disclosure relates to a direct-current power supply device with switching control including a transformer for voltage conversion; for example, relates to a technique effective by being used in an insulated DC-DC converter including a synchronous rectifier circuit on the secondary side of a transformer for voltage conversion.

DESCRIPTION OF RELATED ART

As a type of switching power supply device, there is a switching power supply device (insulated DC-DC converter) that includes an MOS transistor (metal-oxide-semiconductor field-effect transistor) as a switching element for intermittently flowing a current to a primary-side coil of a transformer and a control circuit (IC) that performs ON-OFF control of the element, and rectifies, with a diode, a current in a secondary-side coil induced by flowing a current to the primary-side coil, smooths, with a capacitor, the rectified current, and outputs the smoothed current. However, in such an insulated DC-DC converter using a diode for rectification in a secondary-side circuit, loss in the diode for rectification is large, which reduces the efficiency.

In order to deal with the problem, there is a technique for reducing the loss in a rectifier element and achieving a high efficiency. This technique is a technique of, in place of a diode for rectification in a secondary-side circuit, providing a switching element (MOS transistor) for synchronous rectification therein and, with a secondary-side control circuit, detecting a terminal voltage (source-drain voltage) of the switching element for synchronous rectification and performing turn-on control of the secondary-side switching element in sync with an OFF timing of a switching element in a primary-side circuit.

However, in an insulated DC-DC converter including a secondary-side circuit with synchronous rectification, for example, at start-up, a synchronous rectifier transistor may be turned on by error during an ON period of a primary-side switching element, or an accident of disconnection of the wiring from the drain terminal of a synchronous rectifier transistor on the secondary side (drain is open) may occur, and an abnormal state, such as a state in which an element(s) is heated by a current due to the accident or a state in which the voltage conversion efficiency of a power supply device decreases.

In order to deal with the problem, JP 2019-129549 A, JP 6514910 B2 and US 2018/0006569 A1 disclose a secondary-side control circuit of a DC-DC converter provided with a detection circuit that detects such an abnormal state.

SUMMARY OF THE INVENTION

The secondary-side control circuit (secondary-side control IC) of an insulated power supply device with switching control provided with an abnormality detection circuit disclosed by JP 2019-129549 A, JP 6514910 B2 and US 2018/0006569 A1 is configured to obtain a power supply voltage for the abnormality detection circuit from an output voltage on the secondary side. Hence, if the accident of disconnection of the wiring from a power supply terminal of the secondary-side control IC occurs, a situation may occur where the power supply voltage is not supplied to the abnormality detection circuit and the abnormality detection circuit cannot detect abnormalities.

In a conventional insulated power supply device, even if an abnormality occurs and a synchronous rectifier element is not either turned on or turned off, a current flows through a body diode, and therefore when an abnormality detection circuit detects an abnormality, operation of the secondary-side control circuit stops, but operation of the power supply device as a whole does not stop, in general. As a result, the current continues to flow through the body diode, which causes the problem that an element(s) is heated by the current and the problem that the voltage conversion efficiency of the power supply device decreases due to the loss in the synchronous rectifier element.

The present disclosure has been made in view of the above circumstances, and one of the objects thereof is providing a switching power supply device with synchronous rectification in which an abnormality detection circuit does not stop operating even if no voltage is supplied to a power supply terminal of a secondary-side control circuit.

Another one of the objects of the present disclosure is providing the switching power supply device with synchronous rectification that, as a whole including a primary-side circuit, stops operating when the abnormality detection circuit provided in the secondary-side control circuit detects an abnormality at the power supply terminal, thereby suppressing the loss in and heating of a synchronous rectifier element thereof.

In order to achieve at least one of the objects of the present disclosure, there is provided a switching power supply device including:
  a transformer for voltage conversion;
  a main switching element connected in series with a primary-side coil of the transformer;
  a primary-side control circuit that performs ON-OFF control of the main switching element;
  a switching element for synchronous rectification connected in series with a secondary-side coil of the transformer; and
  a secondary-side control circuit including a switching control circuit that generates a voltage for ON-OFF control of the switching element for synchronous rectification,
  wherein the switching element for synchronous rectification is a metal-oxide-semiconductor field-effect transistor,
  wherein the secondary-side control circuit includes:
    an external terminal to which a drain voltage of the switching element for synchronous rectification is input;
    a power supply terminal to which a voltage rectified by the switching element for synchronous rectification is input;
    a peak hold circuit that holds a peak of the drain voltage input to the external terminal; and
    an abnormality detection circuit that operates based on the voltage at the power supply terminal or a voltage derived from the voltage at the power supply terminal and a holding voltage of the peak hold circuit, and outputs an abnormality detection signal when detecting an abnormal state in which the voltage at the power supply terminal decreases or no voltage is input to the power supply terminal.

BRIEF DESCRIPTION OF DRAWINGS

The accompanying drawings are not intended as a definition of the limits of the present disclosure but illustrate embodiments of the disclosure, and together with the general description given above and the detailed description of the embodiments given below, serve to explain the principles of the disclosure, wherein:

FIG. 3 shows another specific example of the configuration of the abnormality detection circuit provided in the secondary-side control circuit of the embodiment;

FIG. 4 is an operating waveform chart showing how voltages at terminals and a peak hold circuit in the circuit shown in FIG. 3, where an external terminal VP is ground potential (Low level) during normal operation and High level when an abnormality is detected, change;

DETAILED DESCRIPTION

Hereinafter, one or more embodiments of the present disclosure will be described with reference to the drawings.

Figure 1:
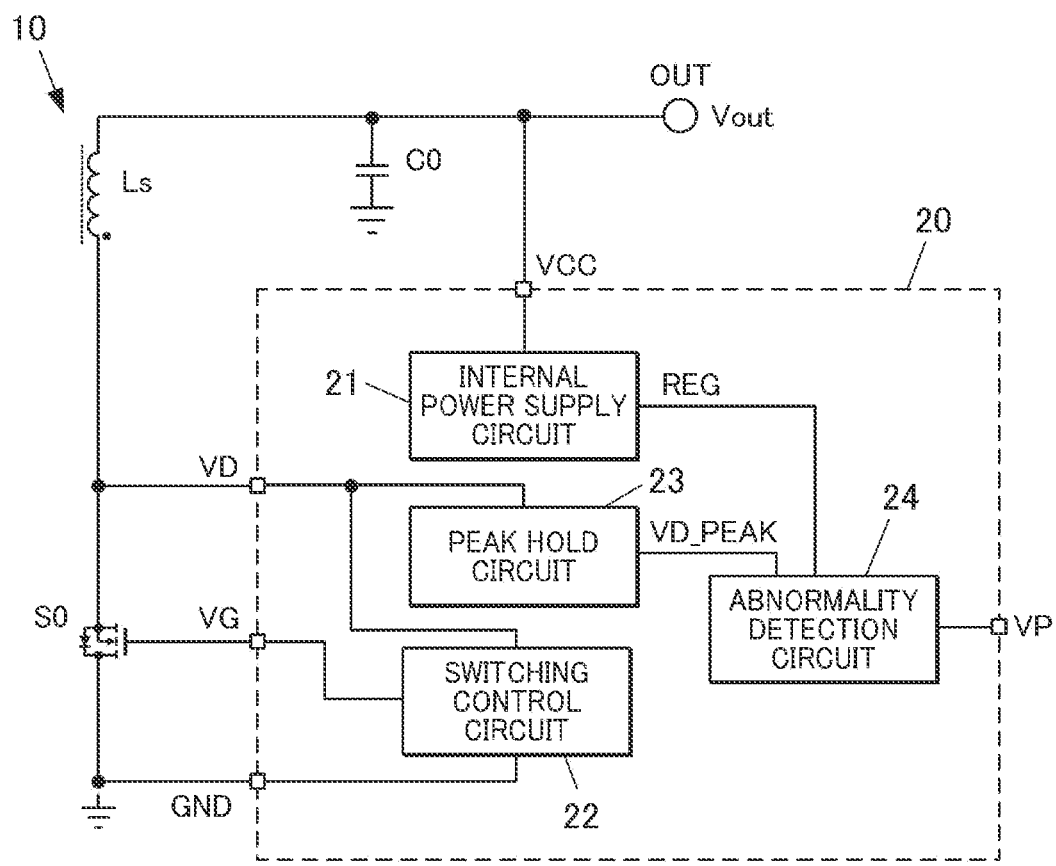
FIG. 1 is a block diagram showing an embodiment of a secondary-side control circuit that constitutes a switching power supply device with synchronous rectification according to the present disclosure.

FIG. 1 shows an embodiment of a secondary-side control circuit 20 that constitutes a secondary-side circuit of a switching power supply device with synchronous rectification according to the present disclosure, together with its peripheral circuits. The secondary-side control circuit 20 of this embodiment is configured as a semiconductor integrated circuit (IC) mounted on a single semiconductor chip or as a semiconductor device installed in a single package.

As shown in FIG. 1, the switching power supply device with synchronous rectification includes a synchronous rectifier transistor S0 (switching element for synchronous rectification) connected in series with a secondary-side coil Ls of a transformer 10, the aforementioned secondary-side control circuit (secondary-side control IC) 20 that performs ON-OFF control of the transistor S0 at predetermined timings, and a secondary-side output terminal OUT through which a voltage Vout rectified by the transistor S0 and smoothed by a smoothing capacitor C0 is output.

The secondary-side control circuit 20 of this embodiment includes a power supply terminal VCC to which the voltage Vout, which is output through the secondary-side output terminal OUT, is applied, and an internal power supply circuit 21 composed of, for example, a series regulator that receives the voltage at the power supply terminal VCC and generates an internal voltage REG appropriate for the circuits in the secondary-side control circuit 20.

The secondary-side control circuit 20 further includes a drain voltage terminal VD (external terminal) to which the drain voltage of the MOS transistor S0 for synchronous rectification is input, and a switching control circuit 22 that detects the source-drain voltage of the transistor S0, and generates and outputs through an external terminal VG an ON/OFF control signal (i.e., ON control signal or OFF control signal) to be applied to the gate terminal of the transistor S0. The switching control circuit 22 operates with the internal voltage REG generated by the internal power supply circuit 21.

The secondary-side control circuit 20 of this embodiment further includes a peak hold circuit 23 that holds a peak value of the voltage at the drain voltage terminal VD and an abnormality detection circuit 24 that detects a decrease in the voltage at the power supply terminal VCC on the basis of a peak voltage VD_PEAK held by the peak hold circuit 23 and the internal voltage REG generated by the internal power supply circuit 21. The secondary-side control circuit 20 of this embodiment further includes an external terminal VP (abnormality output terminal) through which an abnormality detection signal is output to the outside when an abnormality is detected. As the peak hold circuit 23, a circuit similar to a general peak hold circuit can be used, such as a circuit composed of a diode having an anode terminal connected to the drain voltage terminal VD and a capacitor connected between the cathode terminal of the diode and a ground point.

Next, specific examples of the abnormality detection circuit 24 will be described.

Figure 2A:
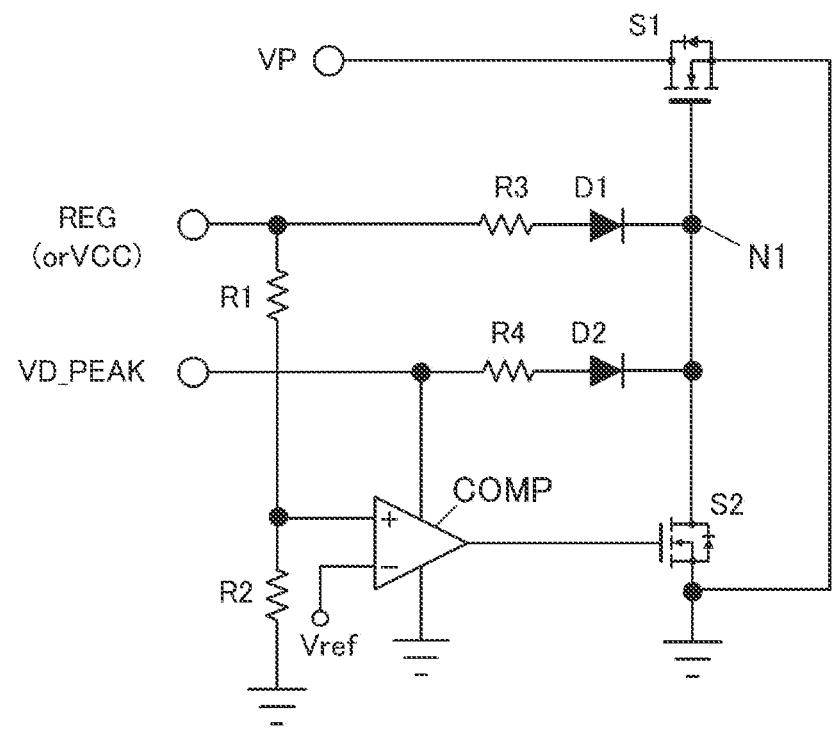
FIG. 2A shows a specific example of the configuration of an abnormality detection circuit provided in the secondary-side control circuit of the embodiment.
Figure 2B:
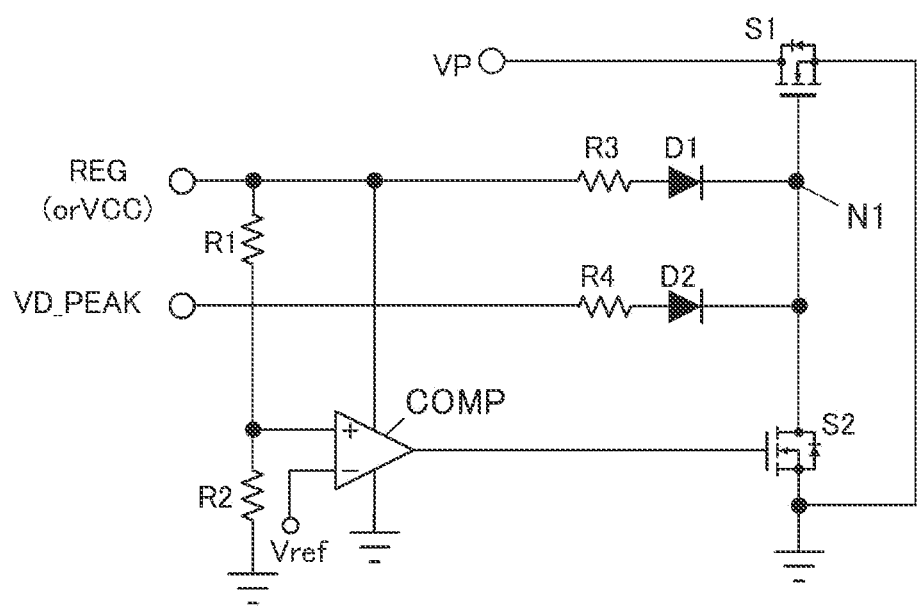
FIG. 2B shows another specific example of the configuration of the abnormality detection circuit provided in the secondary-side control circuit of the embodiment.

FIG. 2A and FIG. 2B each show the abnormality detection circuit 24 that makes (keeps) the external terminal VP high impedance during normal operation and makes the external terminal VP ground potential (Low level) when detecting an abnormality. FIG. 2A shows the abnormality detection circuit 24 in which the power source for a comparator COMP for abnormality detection is the peak voltage VD_PEAK, and FIG. 2B shows the abnormality detection circuit 24 in which the power source for the comparator COMP for abnormality detection is the internal voltage REG.

More specifically, the abnormality detection circuit 24 shown in each of FIG. 2A and FIG. 2B includes a resistance voltage division circuit that is composed of resistors R1, R2 connected in series between a terminal to which the internal voltage REG is input and a ground point and divides the internal voltage REG in accordance with a resistance ratio and the aforementioned comparator COMP as a voltage comparison circuit that compares a divided voltage generated by the resistance voltage division circuit dividing the internal voltage REG with a predetermined reference voltage Vref to determine whether the level of the internal voltage REG is higher than the reference voltage Vref. Although the comparator COMP compares the divided voltage generated by the resistance voltage division circuit (R1, R2) dividing the internal voltage REG with the reference voltage Vref, the comparator COMP may be configured to compare the internal voltage REG, which is the voltage before divided by the resistance voltage division circuit, or the voltage at the power supply terminal VCC with the reference voltage Vref. The value of the reference voltage Vref is determined as appropriate for the configuration of the abnormality detection circuit 24.

The abnormality detection circuit 24 further includes a diode D1 having an anode terminal connected, via a resistor R3, to the terminal to which the internal voltage REG is input, a diode D2 having an anode terminal connected, via a resistor R4, to a terminal to which the peak voltage VD_PEAK is input, and a MOS transistor S2 as a switch (second switch element) having a gate terminal to which an output of the comparator COMP is applied. Cathode terminals of the diodes D1, D2 are connected to the drain terminal of the transistor S2, and the source terminal of the transistor S2 is connected to a ground point.

The abnormality detection circuit 24 further includes a MOS transistor S1 (first switch element) connected between the external terminal VP, through which the abnormality detection signal is output, and the ground point. A potential at a node N1 to which the cathode terminals of the diodes D1, D2 are connected is applied to the gate terminal of the transistor S1. The diodes D1, D2 function as a diode OR logic circuit. The node N1 is an output node of this logic circuit. The abnormality detection circuit 24 shown in each of FIG. 2A and FIG. 2B may be configured such that instead of the internal voltage REG, the voltage at the power supply terminal VCC is input thereto as it is.

Next, operation of the abnormality detection circuit 24 shown in each of FIG. 2A and FIG. 2B will be described.

In the abnormality detection circuit 24 shown in FIG. 2A, if, for example, due to disconnection of the wiring from the power supply terminal VCC of the secondary-side control IC 20, an abnormal state in which the voltage at the power supply terminal VCC does not increase occurs, the internal voltage REG does not increase either, and accordingly the divided voltage generated by the resistors R1, R2 becomes ground potential, so that the output of the comparator COMP becomes Low level, and the transistor S2 is put in the OFF state. Therefore, the node N1 (i.e., potential thereat) to which the drain terminal of the transistor S2 is connected becomes High level with the diode D2, the transistor S1 is turned on, and the external terminal VP becomes Low level (ground potential).

On the other hand, in a normal state in which the voltage at the power supply terminal VCC increases, the internal voltage REG increases, and accordingly the divided voltage generated by the resistors R1, R2 becomes higher than the reference voltage Vref, so that the output of the comparator COMP becomes High level, and the transistor S2 is put in the ON state. As a result, the node N1 to which the drain terminal of the transistor S2 is connected becomes Low level, the transistor S1 is turned off, and the external terminal VP becomes high impedance.

In the abnormality detection circuit 24 shown in FIG. 2B, as the power source for the comparator COMP, the internal voltage REG (or the voltage at the power supply terminal VCC) is used. Hence, if the abnormal state in which the voltage at the power supply terminal VCC does not increase occurs, the output of the comparator COMP is fixed at Low level, and the transistor S2 is put in the OFF state. Therefore, the node N1 to which the drain terminal of the transistor S2 is connected becomes High level with the diode D2 having an anode terminal to which the peak voltage VD_PEAK is input, the transistor S1 is turned on, and the external terminal VP becomes Low level (ground potential).

On the other hand, in the normal state in which the voltage at the power supply terminal VCC increases, the comparator COMP operates and the divided voltage generated by the resistors R1, R2 becomes higher than the reference voltage Vref, so that the output of the comparator COMP becomes High level, and the transistor S2 is put in the ON state. As a result, the node N1 to which the drain terminal of the transistor S2 is connected becomes Low level, the transistor S1 is turned off, and the external terminal VP becomes high impedance.

The abnormality detection circuit 24 shown in each of FIG. 2A and FIG. 2B as examples may be configured to make (keep) the external terminal VP ground potential (Low level) during the normal operation and make the external terminal VP high impedance when detecting an abnormality by reversing the voltages to be input to the inverting input terminal and the non-inverting input terminal of the comparator COMP shown in each of FIG. 2A and FIG. 2B.

FIG. 3 shows another specific example of the configuration of the abnormality detection circuit 24 that makes the external terminal VP Low level (ground potential) during the normal operation and makes the external terminal VP High level when detecting an abnormality.

In the abnormality detection circuit 24 shown in FIG. 3, as the power source for the comparator COMP, the peak voltage VD_PEAK is used. The abnormality detection circuit 24 shown in FIG. 3 is configured such that the output (High level) of the comparator COMP is output as it is as the abnormality detection signal to the external terminal VP, through which the abnormality detection signal is output.

The abnormality detection circuit 24 may be configured to make the external terminal VP High level during the normal operation and make the external terminal VP Low level (ground potential) when detecting an abnormality by reversing the voltages to be input to the inverting input terminal and the non-inverting input terminal of the comparator COMP shown in FIG. 3.

In the abnormality detection circuit 24 shown in FIG. 3, if, for example, due to disconnection of the wiring from the power supply terminal VCC of the secondary-side control IC 20, the abnormal state in which the voltage at the power supply terminal VCC does not increase occurs, the divided voltage generated by the resistors R1, R2 becomes ground potential, so that the output of the comparator COMP, namely, the external terminal VP, becomes Low level. On the other hand, in the normal state in which the voltage at the power supply terminal VCC increases, the divided voltage generated by the resistors R1, R2 becomes higher than the reference voltage Vref, and since the peak voltage VD_PEAK is used as the power source for the comparator COMP, the output of the comparator COMP, namely, the external terminal VP, changes to High level.

In this embodiment, when a primary-side circuit operates and a voltage is induced in the secondary-side coil Ls of the transformer 10, the peak hold circuit 23 holds the peak value of the voltage at the drain voltage terminal VD, and the abnormality detection circuit 24 operates with this voltage. Hence, even if the power supply terminal VCC has been open since before start-up, the VCC-GND has short-circuited since before start-up, or the VCC-GND has short-circuited after start-up, the abnormality detection circuit 24 can detect abnormalities.

FIG. 4 shows how the voltage at the drain voltage terminal VD, the peak voltage VD_PEAK, the voltage at the power supply terminal VCC and the voltage at the external terminal VP change from the start to the end of the operation of the power supply device in a case where the abnormality detection circuit 24 is configured as shown in FIG. 3.

As shown in FIG. 4, when the power supply device starts to operate, the voltage at the power supply terminal VCC gradually increases, and when the voltage at the power supply terminal VCC exceeds the reference voltage Vref, the voltage at the external terminal VP changes to the ground potential (timing t1). If, as in a period T1, the abnormal state in which the voltage at the power supply terminal VCC becomes lower than the reference voltage Vref occurs during the normal operation of the power supply device, the voltage at the external terminal VP changes to High level to inform the outside that an abnormality has occurred.

Next, modifications of the abnormality detection circuit 24 of the above embodiment will be described with reference to FIG. 5A, FIG. 5B and FIG. 6. The modifications shown in FIG. 5A, FIG. 5B and FIG. 6 are circuit configuration examples in which the secondary-side control IC 20 has, in addition to the voltage abnormality detection function of detecting an abnormality in the voltage at the power supply terminal VCC, another abnormality detection function such as a thermal abnormality detection circuit that detects an abnormality in chip temperature, and informs the outside that an abnormality(ies) has been detected by using the external terminal VP used for both functions.

Figure 5A:
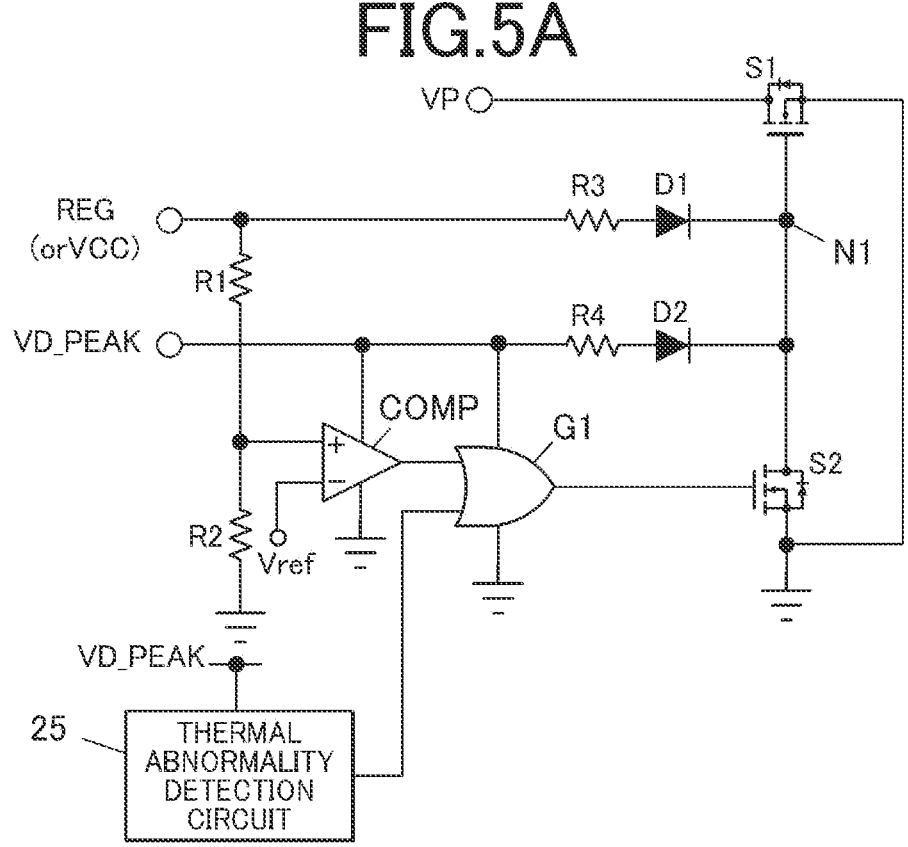
FIG. 5A shows a modification of the abnormality detection circuit shown in FIG. 2A.
Figure 5B:
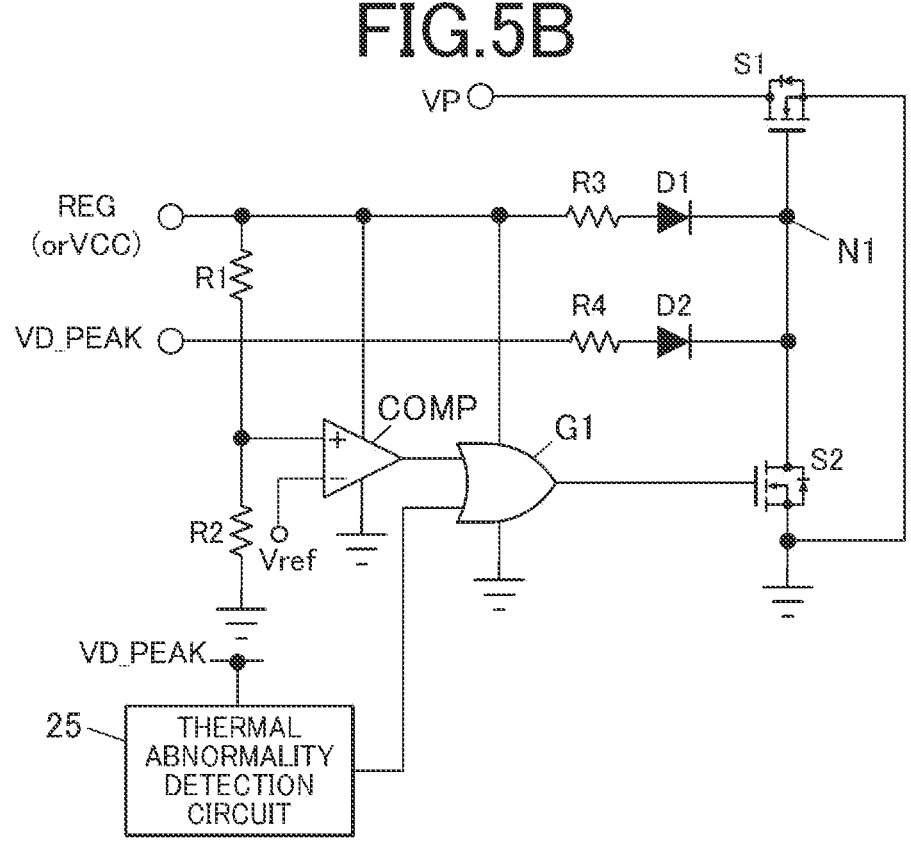
FIG. 5B shows a modification of the abnormality detection circuit shown FIG. 2B.

FIG. 5A shows the abnormality detection circuit 24 shown in FIG. 2A provided with the function of detecting a thermal abnormality and informing the outside that a thermal abnormality has been detected. FIG. 5B shows the abnormality detection circuit 24 shown in FIG. 2B provided with the function of detecting a thermal abnormality and informing the outside that a thermal abnormality has been detected. FIG. 6 shows the abnormality detection circuit 24 shown in FIG. 3 provided with the function of detecting a thermal abnormality and informing the outside that a thermal abnormality has been detected.

More specifically, a thermal abnormality detection circuit 25 is provided, and also an OR logic gate G1 is provided behind the comparator COMP. To the OR logic gate G1, the output of the comparator COMP and an abnormality detection signal from the thermal abnormality detection circuit 25 are input. An output of this OR logic gate G1 is applied to the gate terminal of the transistor S2.

Figure 6:
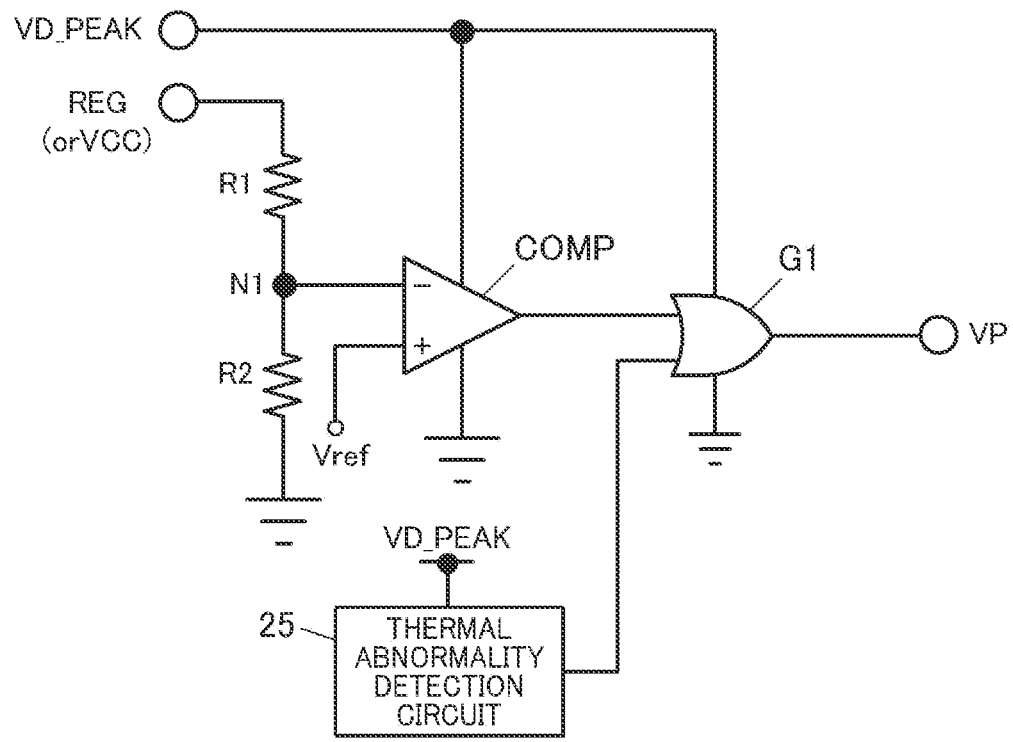
FIG. 6 shows a modification of the abnormality detection circuit shown in FIG. 3.

As shown in FIG. 5A and FIG. 6, in the case where the peak voltage VD_PEAK is used as a power supply voltage (power source) for the comparator COMP, the peak voltage VD_PEAK is used as power supply voltages for the OR logic gate G1 and the thermal abnormality detection circuit 25. Meanwhile, as shown in FIG. 5B, in the case where the internal voltage REG (or the voltage at the power supply terminal VCC) is used as a power supply voltage for the comparator COMP, the internal voltage REG (or the voltage at the power supply terminal VCC) is used as a power supply voltage for the OR logic gate G1.

Next, examples of the configuration of the switching power supply device (DC-DC converter) using the secondary-side control IC 20 including the abnormality detection circuit 24 of the above embodiment will be described with reference to FIG. 7A and FIG. 7B.

Figure 7A:
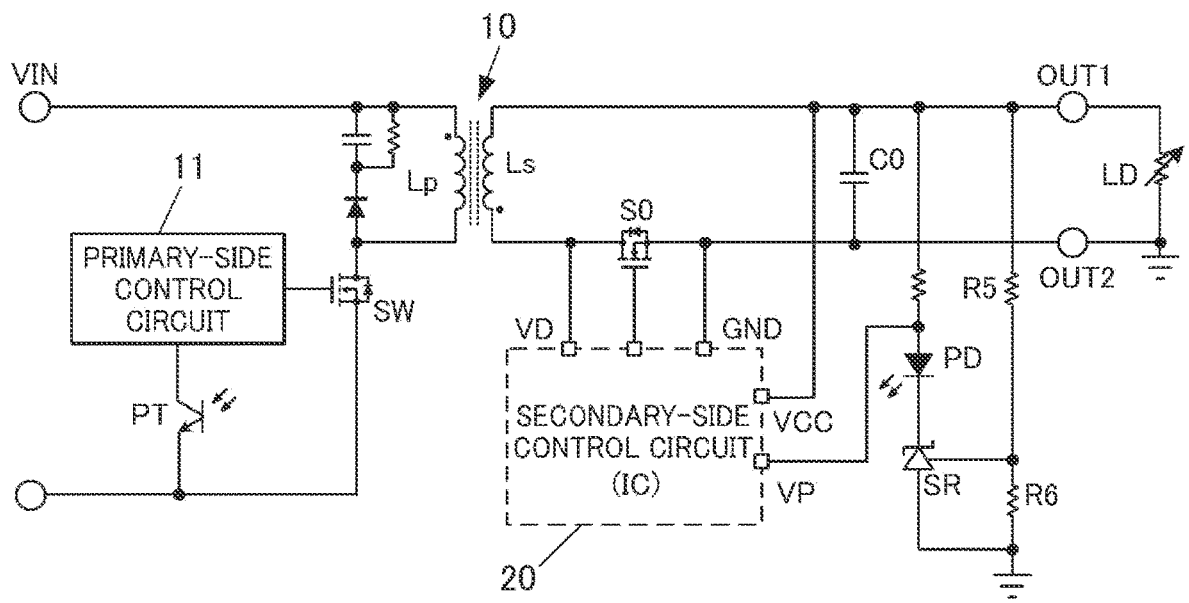
FIG. 7A shows an example of the configuration of the switching power supply device to which the secondary-side control circuit of the embodiment is applied.

FIG. 7A shows the switching power supply device using the secondary-side control IC 20 including the abnormality detection circuit 24 that makes the external terminal VP high impedance during the normal operation shown in each of FIG. 2A and FIG. 2B. FIG. 7B shows the switching power supply device using the secondary-side control IC 20 including the abnormality detection circuit 24 that makes the external terminal VP Low level during the normal operation shown in FIG. 3.

Figure 7B:
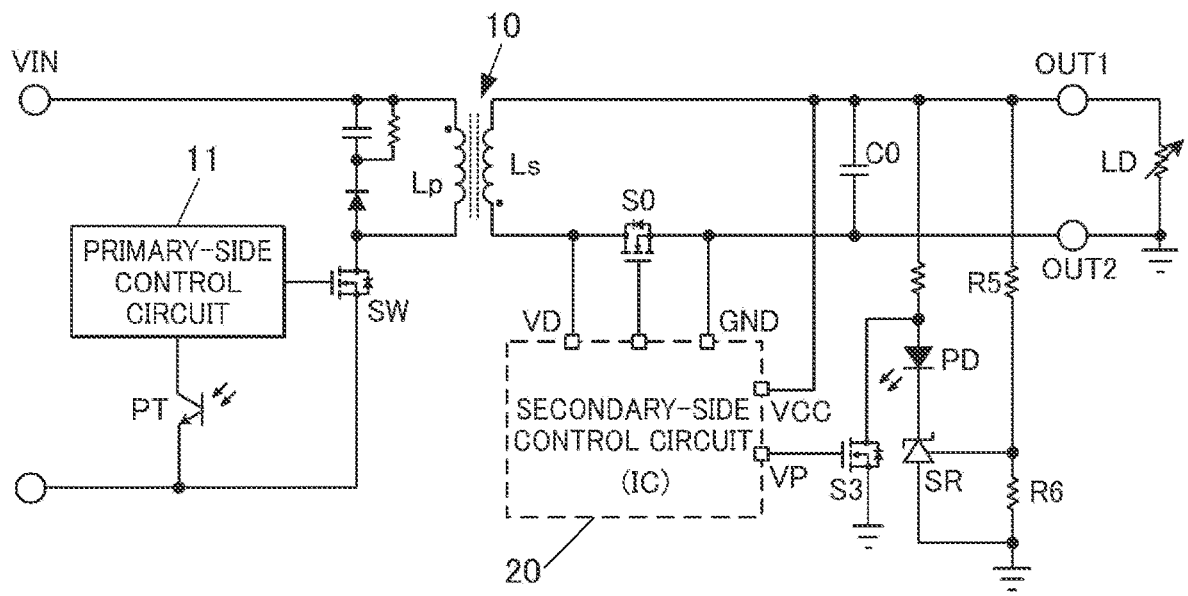
FIG. 7B shows another example of the configuration of the switching power supply device to which the secondary-side control circuit of the embodiment is applied.

As shown in FIG. 7A and FIG. 7B, the switching power supply device with synchronous rectification includes the transformer 10 for voltage conversion having a primary-side coil Lp and the aforementioned secondary-side coil Ls, and on the primary side of the transistor 10, a switching element SW (main switching element) composed of an N-channel MOS transistor and its control circuit (primary-side control circuit) 11. The primary-side control circuit 11 preferably used has a known overvoltage protection (OVP) function or overload protection (OLP) function.

The switching power supply device includes, on the secondary side of the transformer 10, the MOS transistor S0 as a synchronous rectifier element connected in series with the secondary-side coil Ls and its control circuit (secondary-side control IC) 20. A current induced in the secondary-side coil Ls by switching on the primary side is rectified by the transistor S0 and smoothed by the capacitor C0 connected between output terminals OUT1, OUT2. Thus, the switching power supply device is configured as an insulated DC-DC converter that outputs the direct-current voltage Vout through the output terminal OUT. The switching power supply device shown in each of FIG. 7A and FIG. 7B uses the transformer 10 including the secondary-side coil Ls and the primary-side coil Lp, the polarities of which are opposite, to operate as a flyback converter.

The switching power supply device shown in each of FIG. 7A and FIG. 7B further includes a phototransistor PT for light receiving that is connected to the primary-side control circuit 11 and receives a feedback signal from the secondary-side circuit. The primary-side control circuit 11 changes the switching frequency of the switching element SW or the duty cycle of a control signal for the switching element SW in accordance with the feedback signal to deal with change in a load. A variable resistor LD connected between the output terminals OUT1, OUT2 represents the load.

The switching power supply device further includes a photodiode PD for feedback that is connected between the output terminal OUT1 and a ground point, and a shunt regulator SR that is connected in series with the photodiode PD and flows a current corresponding to the potential of the output voltage Vout.

Between the output terminals OUT1, OUT2, resistors R5, R6 for voltage dividing are connected, and a divided voltage generated by dividing the output voltage Vout with the resistance ratio of the resistors R5, R6 is applied to the shunt regulator SR, so that the shunt regulator SR flows a current proportional to the level of the output voltage Vout to the photodiode PD.

The photodiode PD on the secondary side and the phototransistor PT on the primary side constitute a photointerrupter as an insulated signal transmission/conveyance means. Light (feedback signal) emitted from the photodiode PD on the secondary side is received by the phototransistor PT on the primary side, and a feedback voltage corresponding to the intensity of the light is generated. The primary-side control circuit 11 controls the switching element SW with this feedback voltage.

In the switching power supply device shown in FIG. 7A, the external terminal VP of the secondary-side control IC 20 is connected to the anode terminal of the photodiode PD. Hence, during the normal operation in which the external terminal VP of the secondary-side control IC 20 is high impedance, a current corresponding to the potential of the output voltage Vout flows in the photodiode PD.

On the other hand, when the voltage at the power supply terminal VCC of the secondary-side control IC 20 decreases, and the abnormality detection circuit 24 detects the abnormality and accordingly makes the external terminal VP Low level, the anode terminal of the photodiode PD is fixed at Low level, so that no current flows in the photodiode PD. As a result, no current flows in the phototransistor PT on the primary side either, and the overvoltage protection (OVP) function, which the primary-side control circuit 11 has, stops ON-OFF control of the switching element SW on the primary side, thereby stopping the operation of the power supply device.

If the primary-side control circuit 11 does not have the overvoltage protection (OVP) function but has the overload protection (OLP) function, when the voltage at the power supply terminal VCC of the secondary-side control IC 20 decreases, ON-OFF control of the synchronous rectifier transistor S0 stops, so that the state of the secondary-side circuit changes, and the overload protection (OLP) function detects the change in the state and stops ON-OFF control of the switching element SW on the primary side, thereby stopping the operation of the power supply device. If the primary-side control circuit 11 has both the OVP function and the OLP function, either of the functions can be used to stop ON-OFF control of the switching element SW on the primary side, thereby stopping the operation of the power supply device.

In the DC-DC converter shown in FIG. 7B, a MOS transistor S3 as a switch (switch element) is connected in parallel with the photodiode PD and the shunt regulator SR, and the external terminal VP of the secondary-side control IC 20 is connected to the gate terminal of the transistor S3. Hence, during the normal operation in which the external terminal VP of the secondary-side control IC 20 is Low level, the transistor S3 is put in the OFF state, and a current corresponding to the potential of the output voltage Vout is flows in the photodiode PD.

On the other hand, when the voltage at the power supply terminal VCC of the secondary-side control IC 20 decreases, and the abnormality detection circuit 24 detects the abnormality and accordingly makes the external terminal VP High level, the transistor S3 is put in the ON state, and no current flows in the photodiode PD.

As a result, no current flows in the phototransistor PT on the primary side either, and the overvoltage protection (OVP) function or the overload protection (OLP) function, which the primary-side control circuit 11 has, stops ON-OFF control of the switching element SW on the primary side, thereby stopping the operation of the power supply device.

As described above, the secondary-side control circuit of the switching power supply device with synchronous rectification of the above embodiment can ensure that the abnormality detection circuit does not stop operating even if no voltage is supplied (or a voltage is no longer supplied) to the power supply terminal of the secondary-side control circuit. Further, when the abnormality detection circuit of the secondary-side control circuit detects an abnormality at the power supply terminal, it is possible to convey that an abnormality has been detected to the primary-side control circuit via the photointerrupter and stop the operation of the power supply device as a whole, which includes the primary-side circuit, thereby suppressing the loss in and heating of the synchronous rectifier element of the secondary-side circuit.

Although one or more embodiments of the present disclosure have been described above, the present disclosure is not limited to the embodiments. For example, in the modifications of the above embodiment, a logical OR of the abnormality detection signal indicating an abnormality at the power supply terminal and the abnormality detection signal indicating an abnormality in the chip temperature is obtained to change the state of the external terminal VP. However, instead of the thermal abnormality detection function, it is possible, for example, to provide a function of detecting an abnormal state (drain is open) in which the wiring is disconnected from the drain terminal of the MOS transistor S0 for synchronous rectification, and obtain a logical OR of a drain-is-open abnormality detection signal and the abnormality detection signal indicating an abnormality at the power supply terminal to change the state of the external terminal VP.

Further, in the above embodiment, the MOS transistor S3 as a switch connected in parallel with the photodiode PD for transmitting the feedback signal of the output to the primary-side circuit is provided to transmit the abnormality detection signal. However, if the power supply device is a power supply device having a function of transmitting an enable signal from the secondary-side circuit to the primary-side circuit, the function being provided separately from the photodiode PD for transmitting the feedback signal, the power supply device may be configured to transmit the abnormality detection signal by superimposing the signal on the enable signal. Further, a photointerrupter dedicated to transmission of the abnormality detection signal indicating a decrease (abnormality) in the voltage at the power supply terminal of the secondary-side control IC may be provided.

Further, the abnormality detection circuit of the above embodiment that detects an abnormality at the power supply terminal is not limited to being applied to the flyback converter. The abnormality detection circuit is applicable to power supply devices of different power supply methods. For example, the abnormality detection circuit is applicable to a forward converter, a half-bridge converter and so forth in each of which two or more rectifier elements are present on the secondary side and MOS transistors for synchronous rectification are used as these rectifier elements.

Although one or more embodiments of the present disclosure have been described above, the scope of the disclosure is not limited to the embodiments described above but includes the scope of claims below and the scope of their equivalents.

The invention claimed is:

1. A switching power supply device comprising:
   a transformer for voltage conversion;
   a main switching element connected in series with a primary-side coil of the transformer;
   a primary-side control circuit that performs ON-OFF control of the main switching element;
   a switching element for synchronous rectification connected in series with a secondary-side coil of the transformer; and
   a secondary-side control circuit including a switching control circuit that generates a voltage for ON-OFF control of the switching element for synchronous rectification,
   wherein the switching element for synchronous rectification is a metal-oxide-semiconductor field-effect transistor,
   wherein the secondary-side control circuit includes:
      an external terminal to which a drain voltage of the switching element for synchronous rectification is input;
      a power supply terminal to which a voltage rectified by the switching element for synchronous rectification is input;
      a peak hold circuit that holds a peak of the drain voltage input to the external terminal; and
      an abnormality detection circuit that operates based on the voltage at the power supply terminal or a voltage derived from the voltage at the power supply terminal and a holding voltage of the peak hold circuit, and outputs an abnormality detection signal when detecting an abnormal state in which the voltage at the power supply terminal decreases or no voltage is input to the power supply terminal.

2. The switching power supply device according to claim 1,
wherein the abnormality detection circuit includes a voltage comparison circuit that compares the voltage at the power supply terminal or the voltage derived from the voltage at the power supply terminal with a predetermined reference voltage to detect the abnormal state, and
wherein the voltage comparison circuit operates with the holding voltage of the peak hold circuit as a power supply voltage, and generates and outputs the abnormality detection signal to outside when detecting the abnormal state.

3. The switching power supply device according to claim 1,
wherein the abnormality detection circuit includes:
a voltage comparison circuit that compares the voltage at the power supply terminal or a voltage generated by dividing the voltage at the power supply terminal with a predetermined reference voltage to detect the abnormal state;
a first switch element connected between an abnormality output terminal for outputting the abnormality detection signal and a constant potential point;
a second switch element connected between a control terminal of the first switch element and the constant potential point and being turned on or off with an output of the voltage comparison circuit; and
a diode logic circuit to which the voltage at the power supply terminal or the voltage derived from the voltage at the power supply terminal and the holding voltage of the peak hold circuit are input and that has an output node connected to the control terminal of the first switch element, and
wherein the voltage comparison circuit
operates with the holding voltage of the peak hold circuit as a power supply voltage,
when detecting the abnormal state, turns off the second switch element and with an output of the diode logic circuit, turns on the first switch element to output the abnormality detection signal of a low level through the abnormality output terminal, and
in a normal operation state in which the voltage at the power supply terminal does not decrease, turns on the second switch element and turns off the first switch element to make the abnormality output terminal high impedance.

4. The switching power supply device according to claim 3, further comprising:
on a secondary side of the transformer, a photodiode connected between an output terminal on the secondary side and a ground point and transmitting a signal corresponding to an output voltage on the secondary side to the primary-side control circuit; and
on a primary side of the transformer, a phototransistor connected to a feedback terminal of the primary-side control circuit and constituting a photointerrupter together with the photodiode,
wherein the abnormality output terminal is connected to an anode terminal of the photodiode.

5. The switching power supply device according to claim 1,
wherein the abnormality detection circuit includes:
a voltage comparison circuit that compares the voltage at the power supply terminal or a voltage generated by dividing the voltage at the power supply terminal with a predetermined reference voltage to detect the abnormal state;
a first switch element connected between an abnormality output terminal for outputting the abnormality detection signal and a constant potential point;
a second switch element connected between a control terminal of the first switch element and the constant potential point and being turned on or off with an output of the voltage comparison circuit; and
a diode logic circuit to which the voltage at the power supply terminal or the voltage derived from the voltage at the power supply terminal and the holding voltage of the peak hold circuit are input and that has an output node connected to the control terminal of the first switch element, and
wherein the voltage comparison circuit
operates with the voltage at the power supply terminal or the voltage derived from the voltage at the power supply terminal as a power supply voltage,
when detecting the abnormal state, turns off the second switch element and with an output of the diode logic circuit, turns on the first switch element to output the abnormality detection signal of a low level through the abnormality output terminal, and
in a normal operation state in which the voltage at the power supply terminal does not decrease, turns on the second switch element and turns off the first switch element to make the abnormality output terminal high impedance.

6. The switching power supply device according to claim 5, further comprising:
on a secondary side of the transformer, a photodiode connected between an output terminal on the secondary side and a ground point and transmitting a signal corresponding to an output voltage on the secondary side to the primary-side control circuit; and
on a primary side of the transformer, a phototransistor connected to a feedback terminal of the primary-side control circuit and constituting a photointerrupter together with the photodiode,
wherein the abnormality output terminal is connected to an anode terminal of the photodiode.

7. The switching power supply device according to claim 1,
wherein the abnormality detection circuit includes a voltage comparison circuit that compares the voltage at the power supply terminal or a voltage generated by dividing the voltage at the power supply terminal with a predetermined reference voltage to detect the abnormal state, and
wherein the voltage comparison circuit
operates with the holding voltage of the peak hold circuit as a power supply voltage,
when detecting the abnormal state, outputs the abnormality detection signal of a high level through an abnormality output terminal, and
in a normal operation state in which the voltage at the power supply terminal does not decrease, makes the abnormality output terminal a low level.

8. The switching power supply device according to claim 7, further comprising:
on a secondary side of the transformer, a photodiode connected between an output terminal on the secondary side and a ground point and transmitting a signal corresponding to an output voltage on the secondary side to the primary-side control circuit and a switch element connected between an anode terminal of the photodiode and the ground point; and on a primary side of the transformer, a phototransistor connected to a feedback terminal of the primary-side control circuit and constituting a photointerrupter together with the photodiode, wherein the abnormality output terminal is connected to a control gate terminal of the switch element.

* * * * *